United States Patent Office 2,893,168
Patented July 7, 1959

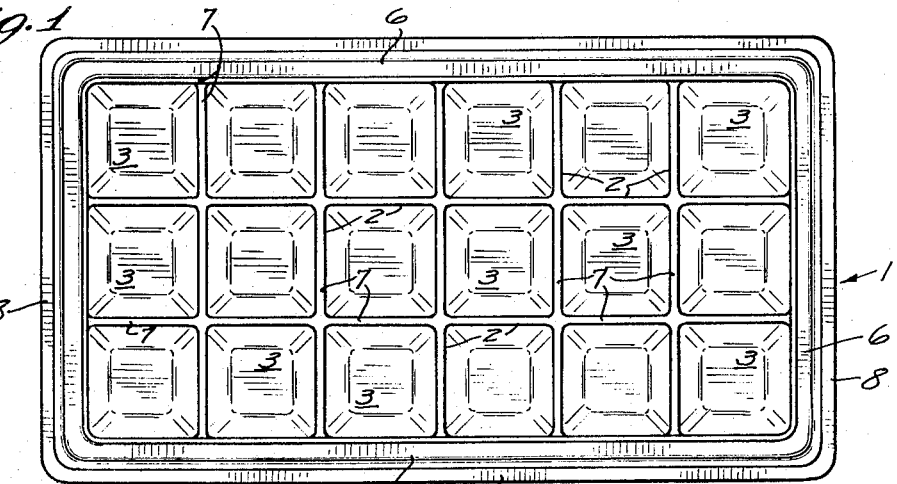
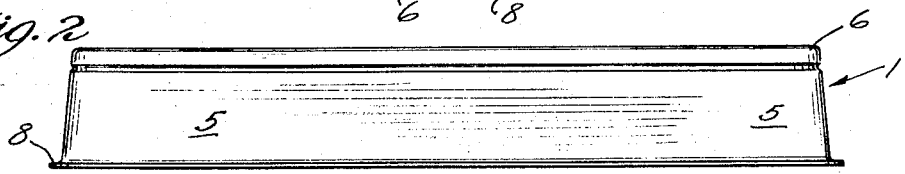
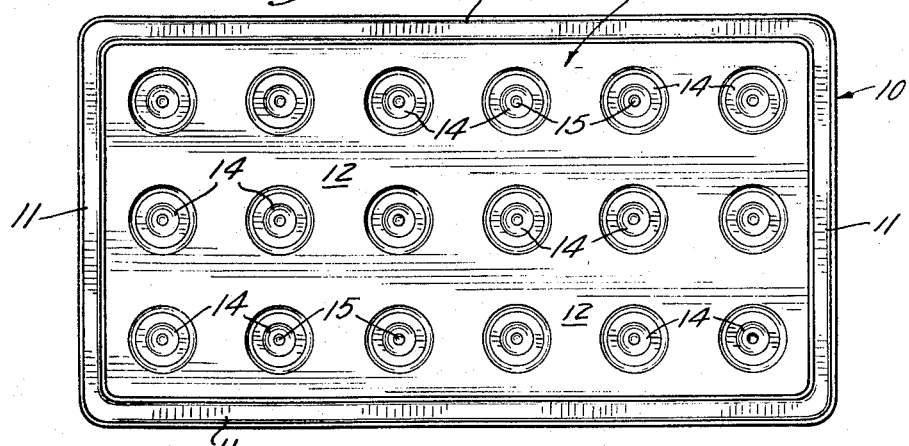
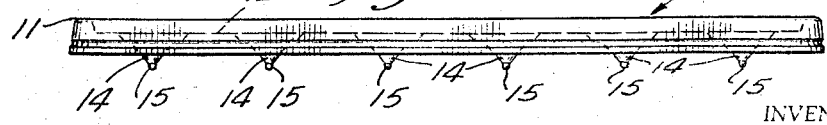

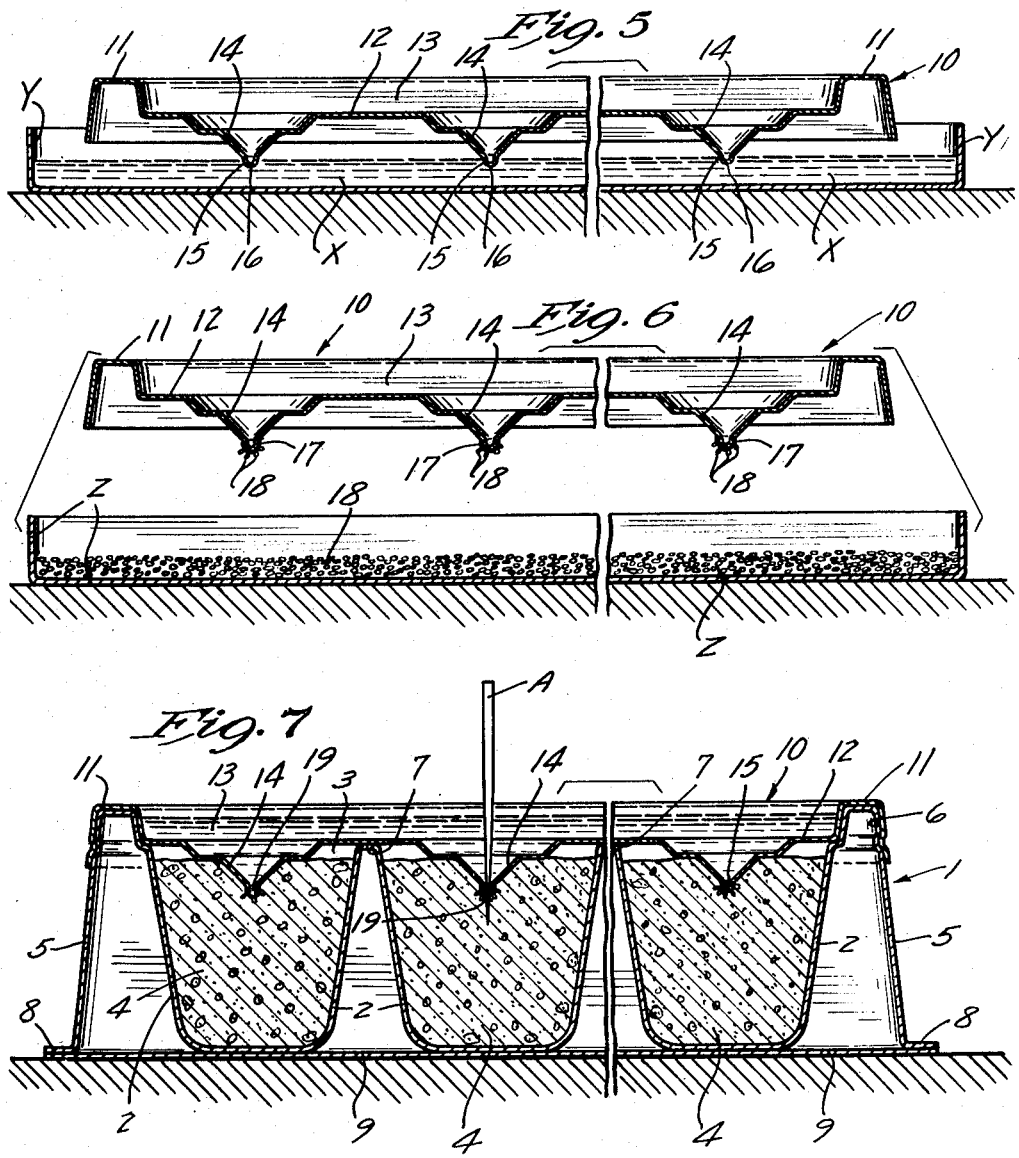

2,893,168

COMBINATION SEED MERCHANDISING AND GERMINATING PACKAGE

Roger D. Kobs, Minneapolis, Minn., assignor to Northrup, King & Co., Minneapolis, Minn., a corporation of Minnesota Continuation of application Serial No. 642,871, February 27, 1957. This application May 5, 1958, Serial No. 733,801

11 Claims. (Cl. 47—37)

My invention relates to devices for germinating of garden seeds for subsequent transplanting and more particularly to a novel combination seed merchandising and germinating package.

This application is a continuation of my co-pending application Serial No. 642,871, filed February 27, 1957, and formally allowed of date March 21, 1958, now abandoned,"Combination Seed Merchandising and Germinating Package," and incorporates a merchandising and germinating container containing potting material, such as vermiculite, into which a plurality of spaced seeds have been placed.

Devices of this character have heretofore been considered commercially unfeasible because due to vibrations essential to transportation, storage and other miscellaneous handling, the seeds fail to maintain the necessary lateral spacing with respect to each other, as well as the necessary extent of burial in the potting material, required to produce satisfactory results. Consequently, germination of the seeds within the potting material has not been uniform, if, in truth, the extent of burial of the seeds did not positively preclude germination.

The primary object of my invention is the provision of a combination seed merchandising and germinating package, including a container containing dry granular potting material, such as vermiculite, and any desired number of seeds, wherein means is provided for positively spacing the seeds laterally while temporarily anchoring the same at a desired level in the potting material.

A further object of my invention is the provision of a device of the class above described wherein a removable top or cover for said container, formed from readily puncturable sheet material, forms an important part of the temporary seed anchoring means.

A further object of my invention is the provision of a device of the class described wherein the said removable top includes a flat portion formed to provide a plurality of laterally spaced dibbles which project downwardly into the potting material and form an important part of the seed anchoring means.

A further object of my invention is the provision of a device of the class immediately above described wherein each of the undersurfaces of said dibbles are treated with water soluble glue in which one or more seeds is temporarily anchored or adhered.

A further object of my invention is the provision of a device of the class immediately above described wherein the marginal wall of said container projects above the plane of said flat portion and defines therewith a water receiving well.

A further object of my invention is the provision of a device of the class immediately above described in which the marginal edge portion of said cover defines an inverted channel-shaped portion which snugly receives the marginal edge of said container.

A further object of my invention is the provision of a device of the class above described wherein said container is divided into a plurality of upwardly opening pot-forming compartments each containing dry granular potting material, and in which the dibbles in said top are centrally located one each with respect to one of said compartments.

A still further object of my invention is the provision of a device of the class immediately above described in which said top is formed from readily puncturable plastic material whereby germination of the seeds in the several compartments may be instantly and simultaneously effected by puncturing the dibbles with a pointed pencil or the like and thereafter filling the water-receiving well in said top with water to moisten the potting material and dissolve the seed positioning glue.

A still further object of my invention is the provision of seed merchandising and germinating packages containing potting material and having in combination therewith novel tops, said tops being formed from readily puncturable transparent sheet material and including flat horizontally disposed portions and upstanding marginal edge portions which together define moisture-receiving wells, said flat horizontal portions being formed to define laterally spaced dibbles which extend into said potting material and introduce moisture into areas of said potting material adjacent said dibbles, upon puncturing of said dibbles.

A further object of my invention is the provision of a combination seed merchandising and germinating package which may be produced in great quantities at a relatively low cost, which is highly efficient in the carrying out of its intended function, and which may be subjected to rough treatment in shipment, storage, and the like, without affecting said efficiency.

The above and still further objects of my invention will become apparent from the following detailed specification, appended claims, and attached drawings.

Referring to the drawings wherein like characters indicate like parts throughout the several views:

Fig. 1 is a view in top plan of the container of my novel structure;

Fig. 2 is a view in side elevation of the structure of Fig. 1;

Fig. 3 is a view in top plan of the novel top for the container of Fig. 1;

Fig. 4 is a view in side elevation of the structure of Fig. 3;

Fig. 5 is an enlarged view in longitudinal section of the novel cover of my device illustrating one of the steps in the formation of the finished product, some parts being broken away;

Fig. 6 is a view corresponding to Fig. 5 but showing a still further step in the formation thereof; and Fig. 7 is a transverse section through my completed novel unit and illustrating the method of initiating the germination of seeds within the compartments thereof.

Referring with greater particularity to the drawings, the numeral 1 indicates in its entirety a container preferably formed from any suitable light-weight moisture resistant material such as a molded plastic. The container 1 is provided with a plurality of partition-forming walls 2 which define individual pots 3 for the reception of suitable potting material 4 such as granular expanded vermiculite, which is relatively inexpensive and is extremely light in weight, particularly when initially inserted in an unmoistened condition. The upstanding marginal wall 5 of the container 1, preferably and as shown particularly in Fig. 7, is formed to provide an upstanding marginal edge portion 6 which projects above the upper limits 7 of the partition-forming walls 2, for a purpose which will hereinafter become apparent. Also preferably and as shown, the bottom edge portions 8 of the marginal wall 5 are joined together by a flat base-forming member 9, for the purpose of imparting stability to the container 1.

Adapted to cooperate with the container 1 immediately above described, is a cover identified in its entirety by the numeral 10. Cover 10 is likewise formed from a suitable plastic sheet material, preferably transparent, and which is readily puncturable, for a purpose which will hereinafter be explained. Cover 10 includes an inverted channel-shaped marginal edge portion 11 which, as shown particularly in Fig. 7, is adapted to snugly receive therein the upstanding marginal edge portion 6 of the container 1. Also the cover 10 includes a horizontally disposed flat plate-like portion 12 below the level of the inverted channel-shaped marginal edge portion 11, said portions 11 and 12 together forming a water-receiving well 13.

At transversely and longitudinally spaced points, the plate-like portion 12 is formed to provide generally conical recesses or hollow dibbles 14, one each of which is generally centrally located in overlying relationship to one of said pots 3. As will be noted, particularly with reference to Fig. 7, the downwardly projecting lower end portions 15 of the dibbles 14 project downwardly into the potting material 4 at a distance which is found to be most ideal for germination of seeds of a given type.

Fig. 5 illustrates the manner in which the undersurfaces 16 of the lower end portions 15 of the dibbles 14 are submerged in a water soluble glue X within a suitable container Y, whereby to form an adhesive coating 17 thereon. While the coating 17 is still in a plastic state, the lower end portions 15 of the dibbles 14 are lowered into a bed Z of seeds 18 of a desired type whereby to cause one or more of said seeds 18 to become temporarily anchored or adhered to the undersurfaces 16 of the lower end portions 15 when the coating 17 is permitted to dry. Thereafter, the cover 10 is placed over the container 1, as shown in Fig. 7 and a unitary package is formed which may be subjected to rough treatment in shipment and storage without dislodging of the seeds 18 from the undersurfaces 16 of the lower end portions 15 of the dibbles 14.

When it is desired to germinate the seeds 18 upon the lower end portions 15, it is but necessary to puncture the lower end portions 15 with any convenient pointed instrument such as a pencil A, as shown in Fig. 7. Thereafter, the water-receiving well 13 and the hollow dibbles 14 are filled with water. The water filters through the punctured openings 19 in the lower end portions 15 and into the potting material 4 in the several compartmented pots 3. In due course, the moisture in the several pots 3 is sufficient to dissolve the layer 17 of glue X on the undersurfaces 16 of the lower end portions 15 and release therefrom the seeds 18, said seeds 18 obviously being then properly centered and at the desired level in the potting material for best growing conditions.

After the released seeds 18 have been caused to germinate, by a combination of moisture and heat, the latter of which is preferably at least in part caused by the sun's rays permitted to pass through the transparent cover 10, the cover 10 is removed and the small plants emanating from the said seeds 18 are permitted to grow to a desired size for transplanting. The transparency of the cover 10 is again an important factor in enabling one to observe the state of germination of the seeds 18, to determine the proper time for the removal of said cover 10 from the container 1.

Growing of the seeds 18 in granular potting material, such as vermiculite, permits the roots of the small plants to be readily separated without damaging same immediately prior to transplanting.

My invention has been thoroughly tested and found to be completely satisfactory for the accomplishment of the above objects, and while I have disclosed a preferred embodiment thereof, it should be obvious that same is capable of modification without departure from the scope and spirit of the appended claims.

What I claim is:

1. An open topped container having potting material therein, a top for said container formed from readily fracturable transparent sheet material, and a hollow dibble formed in said top in spaced relationship to the marginal edges thereof, said dibble projecting downwardly into said potting material and serving as a water receiving well, water within said well being released into said potting material upon puncturing of said dibble.

2. The structure defined in claim 1 in further combination with means removably securing at least one seed to the lower end portion of said dibble.

3. A seed merchandising and germinating unit comprising a container having upstanding marginal walls and containing potting material, a cover for said container formed from generally flat transparent readily fracturable plastic sheet material to define a flat portion and a plurality of laterally spaced dibbles which project downwardly therefrom into the potting material when said cover is in operative position, said dibbles being readily puncturable with the undersurface of each of said dibbles being treated with water soluble glue in which one or more seeds is temporarily securely adhered.

4. The structure defined in claim 3 in which the marginal wall of said cover projects above the horizontal plane of the flat portion thereof and defines therewith a water receiving well.

5. A seed germinating unit comprising a pot-forming container having a quantity of potting material therein and a cover for said container, said cover including a downwardly projecting hollow dibble formed from readily puncturable material and defining a liquid receiving well, said dibble being generally centrally disposed in respect to said container with the lower end portion thereof extending into the potting material with the undersurface of the lower end portion of the dibble being treated with water soluble glue in which at least one seed is temporarily securely adhered.

6. The structure defined in claim 5 wherein said cover is formed from translucent plastic material.

7. The structure defined in claim 5 wherein said cover is formed from transparent plastic material.

8. A seed germinating unit comprising a pot-forming container having a quantity of potting material therein, a cover for said container including a downwardly projecting hollow dibble formed from readily puncturable material and defining a liquid receiving well, said dibble being generally centrally disposed in respect to said container with the lower end portion thereof extending into the potting material and means removably securing at least one seed to the lower end portion of the dibble for positioning such seed in the potting material adjacent to said liquid receiving well.

9. A seed germinating unit comprising a pot-forming container having a quantity of potting material therein, a cover for said container including a downwardly projecting hollow dibble formed from a readily puncturable material, said dibble being generally centrally disposed in respect to said container with the lower end portion thereof extending into the potting material and means removably securing at least one seed to the lower end portion of the dibble, said hollow dibble defining a liquid receiving well so that liquid may be transferred from said well into the potting material when the dibble is punctured.

10. A seed merchandising and germinating unit comprising, a container having generally upstanding partition-forming walls dividing the container into at least one pot-forming compartment for retaining a quantity of potting material therein, a cover for said container including a downwardly projecting hollow dibble generally centrally disposed in respect to each pot-forming compartment and formed from readily puncturable material with the lower portion thereof terminating within the respective pot-forming compartment below the upper marginal edge of the partition-forming walls and defining a liquid receiving well for the respective pot-forming compartment and means removably securing at least one seed to the lower end portion of each dibble.

11. A seed merchandising and germinating unit comprising, a container having an upstanding marginal wall and partition-forming walls dividing same into a plurality of upwardly opening pot-forming compartments each containing potting material, a cover for said container formed from generally flat transparent plastic sheet material to define a plurality of dibbles one each centrally positioned within one of said pot-forming compartments and projecting downwardly into the potting material therein when said cover is in operative position, said dibbles being readily puncturable with the undersurface of each of said dibbles being treated with water soluble glue in which one or more seeds is temporarily securely adhered, the upstanding marginal wall of said container projecting above the level of the partition-forming walls thereof, said cover being formed to define an inverted channel-shaped marginal edge portion which snugly receives the upstanding marginal wall of said container, the dibbles and relatively flat portion of said cover being disposed below the marginal edge portion thereof and defining a water-receiving well therewith.

No references cited.